United States Patent [19]

Demendi et al.

[11] Patent Number: 5,538,649
[45] Date of Patent: Jul. 23, 1996

[54] CARBON COMPOSITE MATEIRAL FOR TRIBOLOGICAL APPLICATIONS

[75] Inventors: Joseph F. Demendi, Crystal Lake, Ill.; Philippe R. Malle, Ormoy-Villers; Yannick A. Le Neve, Amiens, both of France; Xin Chen, Crystal Lake; William R. Clemens, Carpentersville, both of Ill.

[73] Assignee: John Crane Inc., Morton Grove, Ill.

[21] Appl. No.: 535,908

[22] Filed: Sep. 28, 1995

[51] Int. Cl.$^6$ .................................................. C10M 103/02
[52] U.S. Cl. .......................... 508/101; 508/102; 508/105; 508/108
[58] Field of Search ................................. 252/12, 12.2, 11

[56] References Cited

U.S. PATENT DOCUMENTS

| | | | |
|---|---|---|---|
| 3,830,280 | 8/1974 | Larsen | 252/25 |
| 3,836,466 | 9/1974 | Abe | 252/12 |
| 3,953,343 | 4/1976 | Sliney | 252/12 |
| 4,034,133 | 7/1977 | Fleck et al. | 428/64 |
| 4,146,379 | 3/1979 | Copley et al. | 65/18 |
| 5,096,604 | 3/1992 | Miller | 252/11 |

*Primary Examiner*—Ellen M. McAvoy
*Attorney, Agent, or Firm*—Dorn, McEachran, Jambor & Keating

[57] ABSTRACT

A composition of matter for use in tribological applications, such as in mechanical seals, bearings and other sliding or rubbing components, which provides good durability and wear characteristics. The material is used in the "softer" one of two relatively sliding members which are in, or may come into, contact with each other during the relative rotation of one of the member s relative to the other. The material is a carbon or carbonaceous formed material, such as is normally used in the manufacture of a primary seal ring in a mechanical seal, and comprises an additive compound which contains at least one compound from a group consisting of neodymium fluoride, praseodymium fluoride, gadolinium fluoride and lanthanum fluoride.

38 Claims, 1 Drawing Sheet

5,538,649

CARBON COMPOSITE MATEIRAL FOR TRIBOLOGICAL APPLICATIONS

BACKGROUND OF THE INVENTION

1. Field of the Invention

The present invention relates to a composition of matter for use in tribological applications, and more specifically relates to the use of such a composition in mechanical seals, bearings and other sliding or rubbing components which require good durability and wear characteristics.

2. Background Art

Material science has long been used as a basis for choosing materials for components having surfaces which are in, or may come into, sliding contact with each other. For example, in the field of mechanical face seals, a primary ring made of a carbon or carbon like material and a mating ring made of a harder material, such as silicon carbide, tungsten carbide, alumina, stainless steel, etc., are generally known. For a general survey of the materials which have been used and for a description of and the desirable characteristics of those materials for use in the rings of mechanical face seals, see A. O. Lebeck, *Principles and Design of Mechanical Face Seals*, John Wiley & Son, Inc., New York, N.Y., 1991, pp. 78–94.

The particular emphasis of this invention is directed to the "softer" of the two sliding members, e.g., the "carbon" primary ring of a mechanical face seal. The conventional method of producing material for carbon bodies used for the softer of the two members involves a number of steps. First, carbon fillers are mixed together with a carbonaceous binder. The carbon fillers may be selected with the desired particle size distribution from calcined petroleum coke, metallurgical coke, synthetic graphite, natural graphite, lampblack, carbon black and different chars. A char may be defined as a carbonaceous material which has been carbonized in an inert gas or in an oxygen depleted atmosphere. Also, all raw materials contain certain amounts of impurities. For example, certain types of graphites may contain as much as 20% of such impurities, which are commonly referred to as ash.

The binder can be any organic material which readily decomposes and has a relatively high carbon residue upon heating in an inert atmosphere. Good candidates for binders include coal tar, coal tar pitch, synthetic and natural resins, molasses and sugars. Raw material mixing takes place at either room or elevated temperatures, depending upon the binder characteristics.

After mixing, the carbon aggregate is cooled if needed, then crushed and milled to the desired fineness. Then the carbon bodies are formed in a die having the desired shape using a hydraulic press or are isostatically pressed in rubber molds. The formed "green bodies" are then heated in an inert atmosphere from room temperature, raising the temperature at a rate as low as 1° C. per hour at the critical gas evolution stage. The temperature is raised to a minimum of 750° C. but usually to not more than 1200° C. peak temperature.

During the baking process, considerable quantities of volatile are evolved and considerable shrinkage of the material takes place. The binder material becomes pyrolized to form infusible carbon bonds among the filler particles. Carbon bodies baked to less than the graphitization temperature, e.g. about 1500° C. are referred to as carbongraphites. In some cases, the carbon bodies are further heat-treated in an inert atmosphere to as high as 3000° C. for the purpose of purifying and/or graphitizing.

The carbon bodies produced in accordance with the above description are porous and have a high degree of permeability. In order to produce impervious components, the carbon bodies are vacuum-pressure impregnated with selected resins of known types. In some cases, the impregnated carbon bodies again are heat treated in an inert atmosphere to carbonize the resin. After heat treatment, the carbon bodies are again reimpregnated with resin to assure imperviousness.

Carbon material for mechanical seal applications are made by careful selection of filler and binder materials and following specific processing steps. Nevertheless, problems are often encountered during use, for example, in mechanical face seals, with carbon ring wearing and with grooving of the associated hard mating ring. Such problems arise especially at high operating temperatures and pressures, to the detriment of seal performance and durability.

Attempts to reduce seal face wear have included additive materials used in tribological applications to increase the ability of a sliding member to withstand increased wear at temperatures up to 1000° C. Platon et al. in "Study of Tribological Behavior of Si-C and $Si_3N_4$ Ceramic Couples in Terms of Temperature: The Reality" describe artificial bodies of solid lubricant type, such as cerium fluoride powder and plasma coatings. Additionally, solid lubricants are described by Sliney in an article entitled "Rare Earth Fluorides and Oxides: Their Uses as Solid Lubricants at Temperatures to 1800° F." NASATECH NOTE, 1969, NASA-TN-D-5301 and also in U.S. Pat. No. 5,200,098.

Other solid lubricants, including cerium fluoride for use in the context of a high temperature low friction seal in automobiles are described in U.S. Pat. No. 4,951,954. Lubricants containing cerium trifluoride, lanthanum trifluoride, and neodymium trifluoride for use with a recording medium are described in U.S. Pat. No. 4,034,133. Rare earth fluoride lubricants for use in die casting components, such as cerium trifluoride and lanthanum trifluoride, are described in U.S. Pat. No. 3,830,280.

SUMMARY OF INVENTION

What has been found to be necessary is a carbon composite sliding or bearing member comprising a material which combines a number of excellent properties of carbon in respect of chemical resistance, extremely low permeability, high mechanical strength and high modulus of elasticity, and which material exhibits excellent dimensional stability, wear performance, running characteristics and tribological compatibility with the hard mating member against which the carbon composite member slides.

In accordance with these requirements, there is provided a composition of matter for use in a formed carbon composite body, the composition comprising a mixture of at least one compound selected from the group consisting of amorphous carbon, graphitic carbon, including synthetic and natural graphites, petroleum coke, metallurgical coke, lampblack, and chars, and an additive of from 0.10 to 30.00 weight percent of at least one compound selected from the group consisting of neodymium fluoride, praseodymium fluoride, gadolinium fluoride and lanthanum fluoride. Such a composition is described for use in a mechanical seal having a stationary sliding ring and a rotary sliding ring. At least one of the rings is made of the above mentioned carbon composite body. The other ring was made of a material selected from the group consisting of self sintered silicon carbide, cemented tungsten carbide and aluminum oxide bodies. The formed composite body may further include a resin binder, which may be carbonized. In some cases, the body may also contain an impregnating resin to reduce permeability and to increase chemical resistance.

In a preferred embodiment, the material includes the additive as set forth above in a range of from 2.5 to 10.0 weight percent, and in a more preferred embodiment, in a range of from 2.5 to 6.0 weight percent.

Additionally, there is provided a method for manufacturing a formed composite body comprising the steps of mixing a raw batch having at least one ingredient selected from the group consisting of amorphous carbon, synthetic graphitic carbon, natural graphitic carbon, petroleum coke, metallurgical coke, and lampblack in a range of from about 40 weight percent to about 75 weight percent, at least one binder selected from the group consisting of coal tar, coal tar pitch, synthetic resins, natural resins, molasses and sugars, in a range of from about 25 weight percent to about 50 weight percent, and an additive compound selected from a group consisting of neodymium fluoride, praseodymium fluoride, gadolinium fluoride, and lanthanum fluoride in a range of from 0.10 to about 30.00 weight percent, until the raw batch is homogeneous, crushing and milling the cold aggregate of the raw batch mix from the mixing step to a desired particle size distribution, molding the material from the crushing and milling step into the desired body shape by a molding process, heat treating the molded body in a furnace at a temperature sufficient to cure the molded body to complete the polymerization process. In some cases, a further heat treatment, or baking, step may be used to carbonize the binder in an inert atmosphere. Additional optional steps may include impregnating the molded body with a resin and heat treating it to reduce the permeability of the composite body material. Optionally, at least one cycle of reimpregnation and heat treatment may be used to assure imperviousness.

DETAILED DESCRIPTION OF THE PREFERRED EMBODIMENTS

Figure 1:
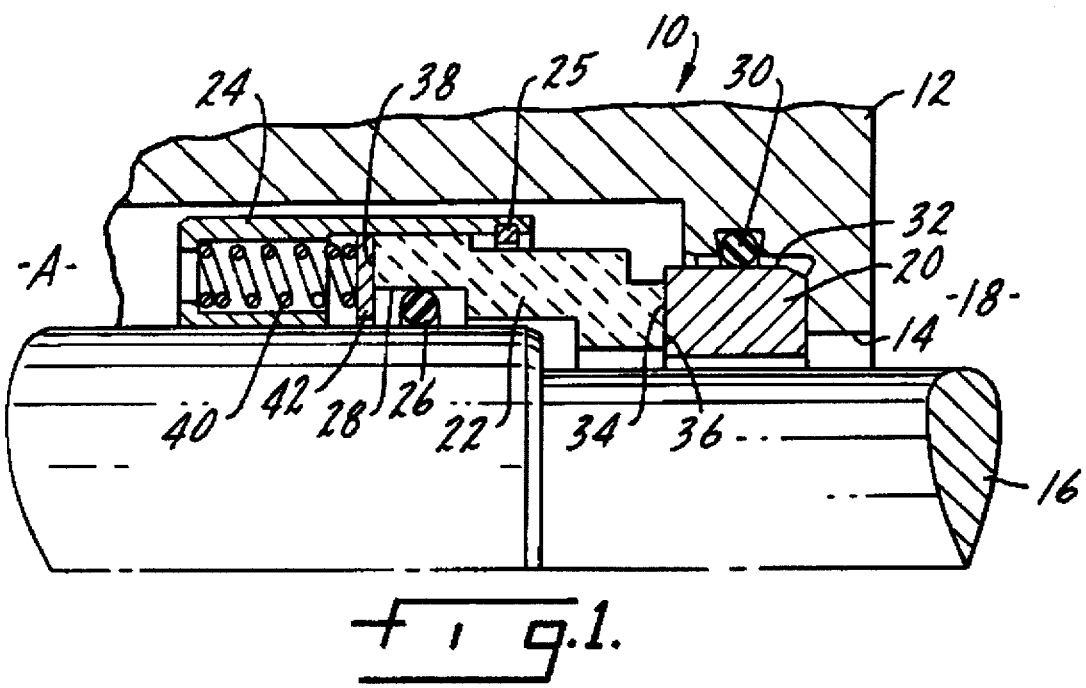
FIG. 1 illustrates a representative mechanical seal in which at least one relatively rotating member comprises a material according to the present invention.

Referring now to FIG. 1, a representative mechanical seal 10 is shown for sealing between a housing 12 having an aperture 14 and a relatively rotating shaft 16 which extends throughout the aperture 14. The seal 10 provides a restriction in the aperture 14 to limit or eliminate leakage of a fluid contained under pressure in a chamber 18 within the housing 12 from escaping into the atmosphere or environment A which is outside the housing 12.

The seal 10 comprises a pair of relatively rotatable and sliding members known as a stator 20, which remains stationary relative to the housing 12, and a rotor 22 which rotates together with the shaft 16. In the representative seal 10 shown in FIG. 1, the rotor 22 includes a retainer 24, having a snap ring 25, to cause the rotor 22 to rotate with the shaft 16. The retainer 24 does not permit radial or circumferential movement of the rotor 22 relative to the shaft 16, but permits limited relative axial movement.

A secondary sealing means, such as O-ring 26, sealingly engages the rotor 22 to the shaft 16. In the representative seal configuration shown, the rotor 22 "floats" on the O-ring 26 and can move to a limited degree in the axial direction relative to the shaft 16. Such axial movement does not affect the secondary seal provided by the O-ring 26 because the axially extending surface 28 of the rotor 22, which in this embodiment is a cylindrical surface, continues to be sealingly engaged by the O-ring 26 despite relative axial movement of the rotor 22 relative to the shaft 16.

The stator 20 includes a secondary seal, such as O-ring 30, which sealingly engages the stator 20 to the housing 12 along an axially extending surface 32 of the stator 20. The stator 20 also includes an essentially planar sealing face 34 for providing sealing engagement with the rotor 22.

The rotor 22 also includes an essentially planar sealing face 36 which is oppositely disposed from the stator sealing face 34 for sealing engagement therewith. The rotor 22 also includes a back face 38 against which a biasing means, such as a spring 40, exerts an axial biasing force to bias the rotor 22 axially against the stator 20, thereby to maintain the sealing engagement between the respective sealing faces 34,36. An optional disc 42 may be provided between the spring 40 and the rotor back face 38, as shown, to center and provide uniform biasing force on the rotor 22.

The seal configuration 10 is representative of a standard contacting seal and is representative of the types of sliding sealing members, such as stator 20 or rotor 22, with which the composition of matter can be used. Of course, the materials disclosed herein can be used with any appropriate device, such as a non-contacting seal as is described in commonly assigned U.S. Pat. No. 4,212,475 or with bearings such as described in U.S. Pat. No. 4,789,250 and also described below. Other modifications to the seal configuration different from the one shown in FIG. 1 are possible. However, detailed description of such modifications is unnecessary because such are known to persons of ordinary skill in the art. For a general description and a survey of mechanical seal configurations, reference may be made to the aforementioned Lebeck text entitled *Principles and Design of Mechanical Face Seals*.

Relative rubbing contact between the faces 28 and 34 of a seal is detrimental to the purpose of maintaining parallel surfaces and of providing good sealing engagement between the seal faces. Over periods of long use of the seal, for example, in a pump or blower, the seal faces rub against each other for extended periods of time. Foreign material from either the fluid being sealed in chamber 18 or from the atmosphere or external environment side A of the seal 10 may become lodged between the seal faces 28,34 causing undesirable abrasion on one or both of the seal faces 28,34.

Such grooves introduce an undesirable leakage path through which the process fluid escapes into the atmosphere A and if the grooves become deep enough, the seal will eventually fail. Accordingly, the materials of the seal rotor or stator are chosen with a view to minimize the creation or aggravation of undesirable grooves and the effects deriving therefrom. For the rotor 22, which in mechanical face seals is also referred as a primary ring in the configuration illustrated in FIG. 1, additives in the carbon material are used to make the sealing member while simultaneously maintaining other desirable characteristics of a carbon material ring.

Figure 2:
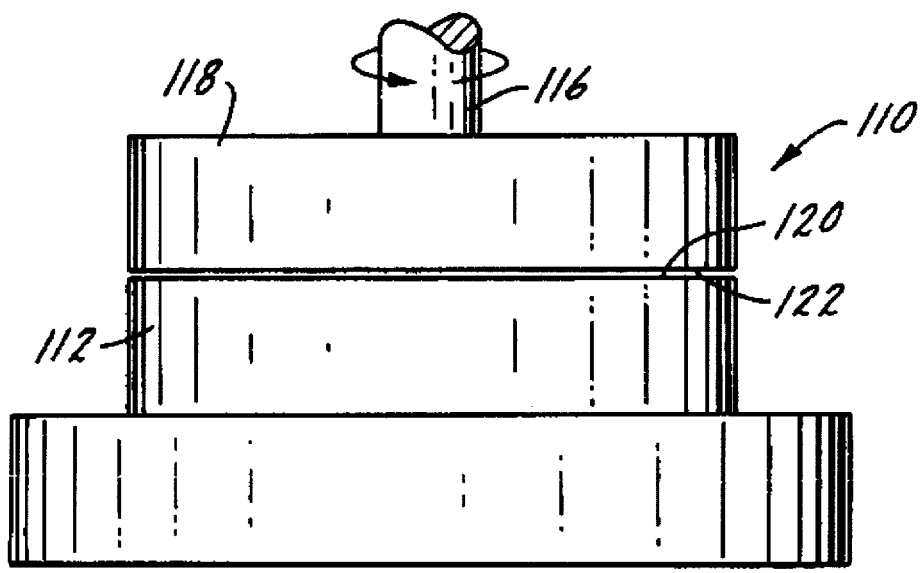
FIG. 2 illustrates a representative wet bearing in which at least one relatively rotating member comprises a material according to the present invention.

Referring now to FIG. 2, a representative bearing, such as a wet bearing 110, is shown for providing a bearing surface of a stationary member, such as stator 112, against a relatively rotating element, such as a rotor 118, attached to rotate with a shaft 116 in the direction of the arrow, as shown. The bearing 110 provides a means for axial support between the two relatively rotating elements while simultaneously permitting sliding or rubbing contact between a surface 120 of the stator 112 and a relatively rotating surface 122 on the rotor 118 which is rotating with the shaft 116. Both of the surfaces 120,122 are essentially planar to permit relative rotation between them.

According to the present invention, it has been found that the running characteristics of a carbon composite material for use in rubbing applications, for example, in a mechanical face seal, a bearing, etc., can be unexpectedly improved by incorporating either neodymium fluoride, praseodymium fluoride, gadolinium fluoride or lanthanum fluoride into the carbon composite mix comprising at least one rubbing member. For most of the additives described herein, technical grade compounds may be used. For example, technical grade neodymium fluoride, at least 98 weight percent is commercially available from Rhone-Poulenc, Inc., having corporate offices in Monmouth, N.J. Articles made according to the present invention can be made in a variety of shapes such as rods, tubes, plates, etc. for use in bearings or can be molded and/or machined into the form of seal rings, vanes, bearings, brushes, contacts, pistons, valve seats, etc.

Carbon composite bodies made in accordance with the present invention may be produced according to any of a number of standard carbon manufacturing processes. The various composite ingredients, such as amorphous carbon, graphitic carbon and carbonaceous binder have to be carefully selected so that the desired physical characteristics of the end product are obtained. Physical and chemical characteristics such as mechanical strength, modulus of elasticity, grain size, permeability, hardness, thermal conductivity, abrasion resistance, corrosion resistance, oxidation resistance, coefficient of thermal expansion are considered to be important, especially for mechanical seal applications. The particle size distribution of the wear preventive additives along with the purity levels must also be carefully controlled to obtain the desired homogeneity of the final composite material in accordance with known principles.

Appropriate blending of the ingredients is another important processing step. The ingredients have to be sufficiently dispersed prior to the mixing step so that agglomeration of constituent materials is minimized. Carbon composite bodies made according to this invention may contain either or both resin or coal tar pitch types of binders. The constituent materials, such as carbon resin binder, etc. can be mixed in a commercially available sigma blade mixer.

When mixing the coal tar pitch binder, the mixing temperature must be high enough to achieve a relatively low viscosity melt. In cases where a resin binder is used, the preferred mixing temperature should be below the polymerization temperature. However, it is possible to allow the mixing temperature to exceed the polymerization temperature if the mixing step is limited to an extremely short duration. Preferably, the mixing time and temperature should be optimally selected for a particular batch ingredients to minimize polymerization during mixing.

After mixing, the cooled aggregates are crushed and milled. The particle size distribution of the milled mix has also to be controlled so that the intrinsic porosity of the mix will not be transferred into the molded artifacts. In practice, the milled mix has to pass through at least a 100 mesh screen.

Next, test specimens are molded at pressures ranging up to 40,000 psi. These test specimens were processed to establish the optimum molding conditions. On the basis of test specimen data, the desired shapes are formed.

The carbon composite bodies made with coal tar pitch binder are then baked to 1000° C. using a standard carbon baking furnace.

The composite bodies made with resin are preferable baked in a special furnace to produce impervious parts to at least 10 bar air pressure without final impregnation.

After baking, the carbon composite bodies made with coal tar pitch binder can be machined into the desired configuration and then again impregnated with resin to provide a high degree of imperviousness.

Physical and chemical characteristics of the carbon composite bodies fabricated according to the above described method were found to be excellent and well within the desirable range of such properties. Evaluation of the tribological characteristics of carbon composite materials in the context of mechanical face seals have provided excellent test results compared with conventional undoped primary carbon rings.

Test conditions used in tribological evaluation were selected to provided as follows:

| test stand | standard instrumented pumps |
|---|---|
| nominal seal diameter, mm | 35 |
| mating ring: | self sintered silicon carbide |
| shaft speed, RPM | 1750 |
| pressure, suction, psig | 140 |
| pressure, discharge, psig | 147 |
| temperature, °C. | 150 |
| test duration, hrs. | 100 |
| test fluid | water |

The above test conditions are considered extremely severe due to the lack of hydrodynamic film at the seal interfaces. Conventional carbon rings will fail this test due to high seal wear and eventual disintegration or destruction on of the hard mating ring surface. Grooving and wearing of the silicon carbide rubbing surface is the rule rather than the exception.

Carbon composite rings made according to the present invention were tested against self sintered silicon carbide back faces and were found to provide excellent tribological performance. This remarkable, unexpected tribological performance is attributed to the presence of the additive, i.e., neodymium fluoride, praseodymium fluoride, gadolinium fluoride or lanthanum fluoride in the carbon composite mixture. Moreover, the appropriate additive is uniformly dispersed throughout the matrix during the manufacturing process. As a result, the running characteristics of the carbon composite ring is not a function of seal ring wear, and good tribological performance is retained even after undergoing substantial seal ring wear. This is a significant advantage over seals having conventional lubricating coatings.

The concentration and uniformity of dispersion of these additives can be measured by an X-ray photographic process due to their high density relative to the carbon material matrix. Test rings were X-rayed and were found to have uniform distribution of the additives. The concentration of the additive can be objectively measured by comparing the X-rays with the same size rings having a known concentration of additive compounds.

The tribological performance of the carbon composite containing neodymium fluoride or lanthanum fluoride was also measured on another seal test ring which was designed to determine speed and pressure sensitivity of the seal materials.

The results at higher rubbing speed were also found to be excellent when a reaction bonded silicon carbide was used as the harder material mating ring. It is postulated that the excellent tribological performance results can be attributed to a thin solid film lubricant deposited from the additive onto the seal interface, thereby reducing friction and wear at the seal interface. This hypothesis was tested by analyzing the composition of the thin film deposit on the silicon carbide interface. It is further postulated that the rate of film formation must be equal to the rate of film removal or otherwise the friction will become excessive leading to seal face wear. Furthermore, the rate of film formation must be low otherwise the wear rate will be high due to the fact that the film is generated from the matrix. In order to illustrate the advantages of the present invention, but with no intention of being limited thereby, the following examples are given.

EXAMPLE 1

In accordance with the present invention, the carbon composite was made to the following formula:

| | |
|---|---|
| Calcined coke powder, weight percent | 25.00 |
| Natural graphite powder, weight percent | 25.00 |
| Neodymium fluoride powder, weight percent | 5.00 |
| Coal tar pitch, weight percent | 45.00 |

The particle size of the fillers and the additive powder were in the subsieve range. The coal tar pitch was standard pencil type. The ingredients were first blended for two hours. Then all ingredients were loaded into a sigma blade type mixer preheated to 200° C. After two hours of mixing, the mix aggregate was discharged into a cooling chamber and allowed to cool down to room temperature. Next, the mix was crushed and milled to a fineness of 99% passing through a 100 mesh screen. First, test specimens were molded at pressures ranging from 8 to 25 tons per square inch. These test specimens were processed first to obtain data needed for part production. On the basis of these test specimen results, tubes were molded isostatically at 18,000 psig. The tubes were packed in steel saggers using standard carbon packing material and were loaded into a carbon baking furnace. The furnace was fired according to a standard 1000° C. baking cycle. The baked tubes were machined into near net shape rings and impregnated with phenol formaldehyde resin. A vacuum-pressure impregnating method was used to assure uniform resin distribution within the pores.

After impregnation, the rings were once again heated to 1000° C. in an inert atmosphere to carbonize the resin. Next the rings were machined into desired configuration and then impregnated with different resins to assure the desired imperviousness. Carbon composite rings without neodymium fluoride were also processed using identical raw materials and processing steps, to provide a control in an identical seal configuration and under identical conditions.

The rings were processed as described above and were incorporated into mechanical seal assemblies. Each of the ring combinations tested for tribological performance using the hot water as the pressurized fluid to be sealed. The tests were conducted for 100 hours at 150° C. using the instrumented test pumps. The results with regard to ring wear were obtained and are summarized as follows:

TABLE 1A

| | carbon primary ring wear | |
|---|---|---|
| additive | Neodymium fluoride | None |
| average wear, | | |
| in micro-inches | 300, 200, 300, 800, 900;200;100;0.0;0.0 | 4,200;4,500; 3,800;16,800 |
| in micrometers | 7.5; 5.0; 7.5; 20; 22.5;5.0;2.5;0,0,0 | 105;112.5; 95; 420 |

| | silicon carbide mating ring wear | |
|---|---|---|
| Additive (to carbon ring) | Neodymium fluoride | None |
| Average wear, | | |
| micro-inches | 5,0,5,25,10,5,0.0,10.0,0.0 | 35,30,30,20 |
| micrometers | .125,0,.125,.625,.25,.125,0,.25,0.0 | .875;.75,.75,.5 |
| Max. grooving, | | |
| micro-inches | 30,10,30, 240,130, 80,30,100,50,110,60 | 400,1000, 1000,1000 |
| in micrometers | .75,.25,.75,6.0,2.0, .75,.25,1.25,2.75,1.5 | 10, 25, 25, 25 |

The results shown above in Table 1A clearly indicate the benefit of using neodymium fluoride as an additive in the carbon composite ring.

The typical physical properties of this carbon composite material as measured by standard methodology is summarized below:

TABLE 1B

| | |
|---|---|
| Apparent density, gram/cc | 1.9 |
| Shore scleroscope hardness | 105 |
| Compressive strength, megapascals(MPa) | 269 |
| Flexural strength, megapascals(MPa) | 76 |
| Sonic modulus of elasticity, megapascals(MPa) | 26,000 |

EXAMPLE 2

Another carbon composite material ring was made using a different concentration of neodymium fluoride. The formula for this composite is given below:

| | |
|---|---|
| Calcined coke powder, weight percent | 25.60 |
| Natural graphite, weight percent | 25.60 |
| Neodymium fluoride powder, weight percent | 2.55 |
| Coal tar pitch, weight percent | 46.25 |

The processing steps used to produce this carbon composite according to the above formula were identical to those described in Example 1.

The tribological testing performed was also identical to that of described in Example 1. The results are listed below in Table 2A.

TABLE 2A

| | carbon primary ring wear |
|---|---|
| Additive | Neodymium fluoride |
| Average wear, | |
| in micro-inches | 1,300; 1,300; 2,900; 1,700; 100; 1,300 |
| in micrometers | 32.5; 32.5; 72.5; 42.5; 2.5; 32.5; |

TABLE 2A-continued

| | silicon carbide mating ring wear |
|---|---|
| Additive (to carbon ring) | Neodymium fluoride |
| Average wear, | |
| micro-inches | 10, 25, 0, 15, 0, 0 |
| in micrometers | .25,.63, 0,.375, 0, 0 |
| Max. grooving, | |
| micro-inches | 255, 220, 380, 160, 30, 145 |
| in micrometers | 6.3, 5.5, 9.5, 4.0,.75, 3.63 |

EXAMPLE 3

A carbon composite has also been made using lanthanum fluoride as a wear preventive additive. The formula for this grade is shown below:

| | |
|---|---|
| calcined coke powder, weight percent | 25.00 |
| natural graphite powder, weight percent | 25.00 |
| lanthanum fluoride powder, weight percent | 5.00 |
| coal tar pitch, weight percent | 45.00 |

The calcined coke, natural graphite and coal tar pitch were taken from the same lot used for making the carbon composite material described in Example 1. The carbon composite samples made for tribological evaluation were produced in accordance with the process as described in making the carbon rings of Example 1.

The machine carbon composite rings were incorporated into mechanical seal assemblies and tested as described in Example 1. The results obtained are shown below in Table 3A.

TABLE 3A

| | carbon primary ring wear | |
|---|---|---|
| Additive | Lanthanum fluoride | None |
| Average wear, | | |
| in micro-inches | 100; 500 | 1,000; 1,500 |
| in micrometers | 2.5;12.5 | 25; 37.5 |

| | silicon carbide mating ring wear | |
|---|---|---|
| Additive (to carbon ring) | Lanthanum fluoride | None |
| Average wear, | | |
| in micro-inches | 0.0,10.0 | 0.0,0.0 |
| in micrometers | 0;.25 | 0,0 |
| Max. grooving, | | |
| in micro-inches | 35,120 | 550,320 |
| in micrometers | .88;3.2 | 13.75, 8.0 |

EXAMPLE 4

The following example will further illustrate the broad scope of the present invention especially to those who are skilled in the art. The carbon composite is made by using a thermoset resin instead of a thermoplastic material as a binder. The formula for this material is shown below:

| | |
|---|---|
| coke powder, weight percent | 40.00 |
| graphite powder, weight percent | 25.00 |
| phenol formaldehyde resin powder, weight percent | 30.20 |
| neodymium fluoride powder, weight percent | 4.00 |
| zinc stearate powder, weight percent | 0.80 |

The above listed ingredients are mixed in a high intensity mixer until a homogenous mixture is obtained. The homogenized mix is crushed and milled to the appropriate particle size distribution. The carbon composite rings are then pressed-to-size in a steel die heated to about 150° C. for tribological evaluation. The size of the die was selected to compensate for the shrinkage taking place during the carbonization process. The molded parts are cured to 300° C. in an oven.

In some cases, the cured components are baked in an inert atmosphere oven to at least 800° C. The baking cycle was established to allow sufficient time to carbonize the binder in such a manner that the carbon composite rings have substantially zero permeability at 10 bar air pressure.

In order to demonstrate the beneficial effect of neodymium fluoride as a wear preventive additive, another mix was made using the same raw materials except neodymium fluoride was deleted from the formulation. The mix was processed into rings according to the same method as described above for the neodymium fluoride containing mix. The neodymium fluoride containing rings along with the control rings were then incorporated into mechanical seals and tested on instrumented automotive water pumps for 500 hours. The results obtained indicated that the neodymium fluoride containing rings were found to have practically zero wear, less than forty micro-inches (one micron), and negligible seal leakage. The control rings, having no additive, have failed the tests with regard to seal leakage and wear characteristics.

EXAMPLE 5

Optionally, a powder, such as bronze, copper or ceramic powders may be included in the formula of Example 4 above. Powder may be added in proportions up to 30 weight percent of the total material weight to change tribological characteristics of the parts. For example, addition of a metal powder, such as bronze or copper flakes increases thermal conductivity, thereby frictional heat generated at the seal interface can be removed more effectively. Furthermore, heat removal from the seal interface is minimizes thermal gradients within the parts, thereby assuring greater thermal dimensional stability. Addition of a ceramic powder, such as silicon carbide, tungsten carbide or aluminum oxide powders, also can be beneficial to the operation of the seal.

The invention has been described in detail in the above cited examples and with regard to specific embodiments. Various modifications and changes can be made to devices made in accordance with the teaching of this patent without departing from the scope and spirit of the invention as claimed below.

What is claimed is:

1. A formed carbon composite body having a material comprising a mixture of at least one compound selected from the group consisting of amorphous carbon, graphitic carbon, including synthetic and natural graphite, petroleum coke, metallurgical coke, lampblack, and chars; and an additive of from 0.10 to 30.00 weight percent of at least one compound selected from the group consisting of neodymium fluoride, praseodymium fluoride, gadolinium fluoride and lanthanum fluoride.

2. A formed carbon composite body according to claim 1 further comprising a thermosetting resin.

3. A formed carbon composite body according to claim 1 further comprising an impregnating resin impregnated into said body after it is formed to reduce permeability.

4. A formed carbon composite body according to claim 1 wherein said additive compound is present in the range of from 2.5 to 10.00 weight percent.

5. A formed carbon composite body according to claim 1 wherein said additive compound is present in the range of from 2.5 to 6.00 weight percent.

6. A formed carbon composite body according to claim 1 wherein said additive compound is essentially pure neodymium fluoride.

7. A formed carbon composite body according to claim 1 wherein said additive compound is essentially pure lanthanum fluoride.

8. A formed carbon composite body according to claim 5 wherein said additive compound is essentially pure neodymium fluoride.

9. A formed carbon composite body according to claim 5 wherein said additive compound is essentially pure lanthanum fluoride.

10. A mechanical end face seal disposed between a housing and a relatively rotating shaft extending through a housing aperture in the housing, the seal comprising:

a) a mating ring having a mating ring seal face sealed with respect to and connected to rotate with said shaft;

b) an axially-movable primary ring having a primary ring seal face opposed to and mating with said mating ring seal face, said primary ring being sealed with respect to said housing and connected to said housing by a primary ring retainer assembly, the primary ring comprising a carbon composite body having a mixture of at least one compound selected from the group consisting of amorphous carbon, graphitic carbon such as synthetic and natural graphite, petroleum coke, metallurgical coke, lampblack, and chars, and an additive of from 0.10 to 30.00 weight percent of at least one compound selected from the group consisting of neodymium fluoride, praseodymium fluoride, gadolinium fluoride and lanthanum fluoride.

11. A mechanical end face seal according to claim 10 wherein said additive compound is present in the range of from 2.5 to 10.00 weight percent.

12. A mechanical end face seal according to claim 10 wherein said additive compound is present in the range of from 2.5 to 6.00 weight percent.

13. A formed carbon composite body according to claim 12 wherein said additive compound is essentially pure neodymium fluoride.

14. A formed carbon composite body according to claim 12 wherein said additive compound is essentially pure lanthanum fluoride.

15. A formed carbon composite body according to claim 10 wherein said additive compound is essentially pure neodymium fluoride.

16. A formed carbon composite body according to claim 10 wherein said additive compound is essentially pure lanthanum fluoride.

17. A sliding bearing arrangement at least a portion of which is connected to a rotating shaft, the bearing comprising a first member having a bearing face in opposed and relatively sliding relationship to a second member of said bearing arrangement, at least said first member further comprising a carbon composite body having a mixture of at least one compound selected from the group consisting of amorphous carbon, graphitic carbon such as synthetic and natural graphite, petroleum coke, metallurgical coke, lampblack, and chars, and an additive of from 0.10 to 30.00 weight percent of at least one compound selected from the group consisting of neodymium fluoride, praseodymium fluoride, gadolinium fluoride and lanthanum fluoride.

18. A sliding bearing arrangement according to claim 17 further comprising an impregnating resin impregnated into said first member after it is formed.

19. A sliding bearing arrangement according to claim 17 wherein said additive compound is present in said formed carbon composite body in the range of from 2.5 to 10.00 weight percent.

20. A sliding bearing arrangement according to claim 17 wherein said additive compound is present in said formed carbon composite body in the range of from 2.5 to 6.00 weight percent.

21. A sliding bearing arrangement according to claim 17 wherein said additive compound is essentially pure neodymium fluoride.

22. A sliding bearing arrangement according to claim 17 wherein said additive compound in said formed carbon composite body is essentially pure lanthanum fluoride.

23. A sliding bearing arrangement according to claim 17 wherein said additive compound in said formed carbon composite body is essentially pure neodymium fluoride.

24. A raw batch used in a mixture for making a formed carbon composite body, the raw batch comprising a) at least one ingredient selected from the group consisting of amorphous carbon, synthetic graphitic carbon, natural graphitic carbon, petroleum coke, metallurgical coke, and lampblack in a range of from about 40 weight percent to about 75 weight percent;

b) at least one binder selected from the group consisting of coal tar, coal tar pitch, synthetic resins, natural resins, molasses and sugars, in a range of from about 25 weight percent to about 50 weight percent;

c) at least one additive compound selected from a group consisting of neodymium fluoride, praseodymium fluoride, gadolinium fluoride, and lanthanum fluoride in a range of from 0.10 to about 30.00 weight percent; and d) inorganic impurities deriving from the raw materials used.

25. A raw batch according to claim 24 wherein said additive compound is present in the range of from 2.5 to 10.00 weight percent.

26. A raw batch according to claim 24 wherein said additive compound is present in the range of from 2.5 to 6.00 weight percent.

27. A raw batch according to claim 19 wherein said additive compound is essentially pure neodymium fluoride.

28. A raw batch according to claim 19 wherein said additive compound is essentially pure lanthanum fluoride.

29. A raw batch according to claim 24 wherein said additive compound is essentially pure neodymium fluoride.

30. A raw batch according to claim 24 wherein said additive compound is essentially pure lanthanum fluoride.

31. A raw batch according to claim 24 further comprising at least one powder additive selected from the group consisting of bronze powder, copper flakes and a ceramic powder in a range of from 0 to about 30 weight percent.

32. A formed carbon composite body according to claim 1 wherein said material mix further comprises at least one powder additive selected from the group consisting of bronze powder, copper flakes and ceramic powder in a range of from 0 to about 30 weight percent.

33. A mating ring for use in the mechanical seal according to claim 1 wherein said material mix further comprises at least one powder additive selected from the group consisting of bronze powder, copper flakes and ceramic powder in a range of from 0 to about 30 weight percent.

34. A method of forming a carbon composite body, comprising the steps of
   a) mixing a raw batch having at least one ingredient selected from the group consisting of amorphous carbon, synthetic graphitic carbon, natural graphitic carbon, petroleum coke, metallurgical coke, and lampblack in a range of from about 40 weight percent to about 75 weight percent, at least one binder selected from the group consisting of coal tar, coal tar pitch, synthetic resins, natural resins, molasses and sugars, in a range of from about 25 weight percent to about 50 weight percent, and at least one additive compound selected from a group consisting of neodymium fluoride, praseodymium fluoride, gadolinium fluoride, and lanthanum fluoride in a range of from 0.10 to about 30.00 weight percent, until said raw batch is homogeneous;
   b) crushing and milling the cold aggregate of the raw batch mix from step a) to a desired particle size distribution;
   c) molding the material from the crushing and milling step into the desired body shape by a molding process;
   d) heat treating the molded body in a furnace at a temperature sufficient to cure said molded body.

35. The method of forming a carbon composite body according to claim 34 including the additional step of
   e) baking said molded body at a sufficiently high temperature, greater than the heat treating temperature, to carbonize said binder.

36. The method of forming a carbon composite body according to claim 35 including the additional step of
   e) impregnating the molded body with an impregnating resin to increase chemical resistance and imperviousness of said body.

37. The method of forming a carbon composite body according to claim 36 including the additional step of
   f) baking said molded body at a sufficiently high temperature, greater than the heat treating temperature, to carbonize said impregnating resin.

38. The method of forming a carbon composite body according to claim 37 wherein the following steps are repeated at least once:
   g) reimpregnating the molded body with an impregnating resin to increase chemical resistance and imperviousness of said body; and
   h) baking said molded body at a sufficiently high temperature, greater than the heat treating temperature, to carbonize said impregnating resin.

* * * * *

UNITED STATES PATENT AND TRADEMARK OFFICE
CERTIFICATE OF CORRECTION

PATENT NO. : 5,538,649
DATED : July 23, 1996
INVENTOR(S) : Demendi et al.

It is certified that error appears in the above-indentified patent and that said Letters Patent is hereby corrected as shown below:

On the Cover Page:
In the Title Block [54]:
"MATEIRAL" should read --MATERIAL--;

Column 1, line 1,
"MATEIRAL" should read --MATERIAL--.

Signed and Sealed this

Twenty-ninth Day of April, 1997

*Attest:*

BRUCE LEHMAN

*Attesting Officer*  Commissioner of Patents and Trademarks